Figure 1:
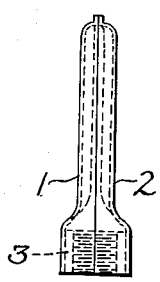

O. C. KNIPE.
PROCESS OF WELDING SHEET METAL.
APPLICATION FILED DEC. 1, 1905.

1,001,049.

Patented Aug. 22, 1911.

Witnesses.

Inventor:
Oliver C. Knipe,
by
Att'y.

UNITED STATES PATENT OFFICE.

OLIVER C. KNIPE, OF PALO ALTO, CALIFORNIA.

PROCESS OF WELDING SHEET METAL.

1,001,049.  Specification of Letters Patent.  Patented Aug. 22, 1911.

Application filed December 1, 1905. Serial No. 289,818.

*To all whom it may concern:*

Be it known that I, OLIVER C. KNIPE, a citizen of the United States, residing at Palo Alto, county of Santa Clara, State of California, have invented certain new and useful Improvements in Processes of Welding Sheet Metal, of which the following is a specification.

This invention relates to the manufacture of hollow metal articles of relatively thin sheets of metal, and particularly to those made of thin sheets having planished surfaces.

Hollow articles of sheet metal are usually made with folded or riveted seams or joints, and when a watertight construction is required the joints are soldered or brazed. In the case of metal pipe a sheet metal blank is shaped by drawing through a forming die and the edges lapped or made to abut while the whole pipe is at a welding heat when the edges are welded together by pressure. Pipes are sometimes made seamless by drawing a thick tube through an annular die, but although the product by the latter process is a fine one, the cost of manufacture is great. The cheaper methods produce only an inferior article, the fine finish of the metal sheet as it comes from the rolls being blemished by the heat, and the joint being unreliable.

The object of my invention is to make such articles without destroying the lustrous and attractive finish given it by the rolls, and to reduce the cost of manufacture far below that of the drawing process by which seamless tubing is made.

In carrying out my invention, I strike out in a forming press or form between rolls counterpart sections which may be assembled to produce the desired hollow article, and place them between water-cooled blocks which almost entirely surround them, leaving only the edges at the several joints exposed. Heat is then applied at the edges until a welding or brazing temperature is reached. I prefer to obtain the heat by passing an electric current of proper density across the joints, though I may also use a flame for this purpose. When power is cheap the electric process is preferable, as the joint is not only a more perfect one, but the finish is more attractive.

When closed metal articles, such as steam radiators, condensers and the like are made, the counterpart sections are assembled on a bed-plate in good contact with a water-cooled block connected to one terminal of an electric source such as a low-tension transformer, and another water-cooled block connected with the other terminal of the transformer is brought into firm electrical contact with the upper section. Cold water is circulated through the blocks to prevent any considerable rise of temperature over the contact areas with the several sections, thereby localizing the heat at the edges of contact where the joints are to be made. Thus the finish on the metal is not disturbed except at the line where the joints are made, which is so narrow that it is easily dressed if thought necessary. When pipes are to be made the water-cooled blocks are mounted to admit of easy introduction and withdrawal of the parts before and after they are united. Thus the distinguishing feature of my process is the welding together of the counterpart sections at several sides or edges simultaneously, while all the parts except the joint edges are kept at a low heat or relatively cool; and my article is distinguished by the unblemished finish or planished surface and the multiple joints.

The novel features of my invention will be particularly indicated in the claims.

Figure 2:
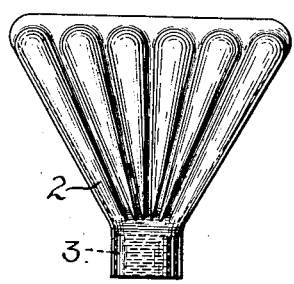
Figure 3:
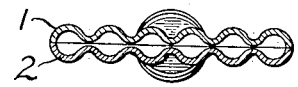
Figure 4:
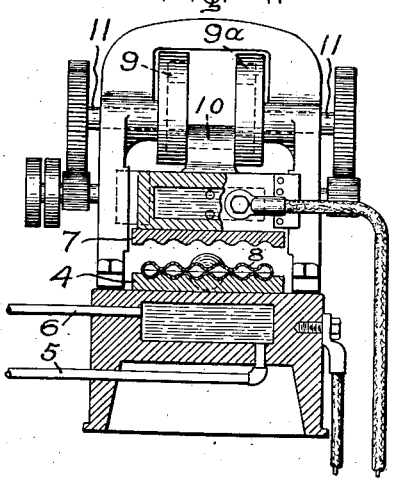
Figure 5:
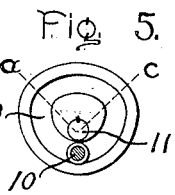
Figure 8:
Figure 6:
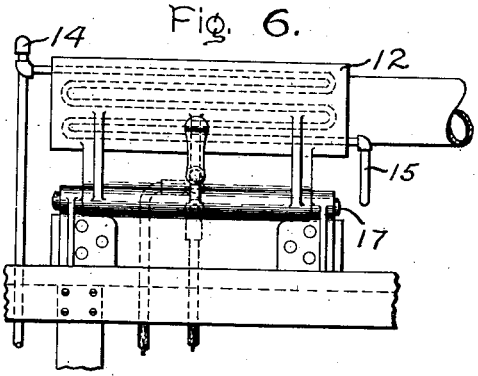
Figure 7:
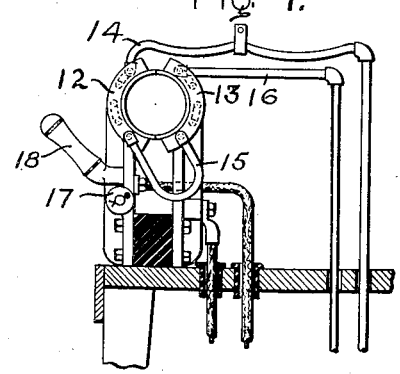

In the drawings, Figures 1, 2 and 3 are views of a hollow article of more or less irregular contour, made in accordance with my invention; Fig. 4 is a front elevation, partly in section of means for carrying out the invention on articles of irregular outline such as shown in Figs. 1, 2 and 3; Fig. 5 shows a detail of the cam movement used on the machine of Fig. 4; Figs. 6 and 7 are side and end views of a pipe-forming apparatus involving my invention; and Fig. 8 is a view of the assembled pipe parts.

I will first describe Figs. 1 to 5. The hollow article here illustrated is a steam radiator made of sheet metal. The counterpart sections 1 and 2 are stamped from sheet metal such as sheet steel, being curved to meet along an edge around the outside. The neck where connection is to be made with the feed pipes is reinforced by a threaded bushing 3. This bushing may be a threaded ring, and the heat be raised to weld it fast to the divided neck of the radiator, or it may be split at one point and squeezed in when the neck parts are welded and held under pressure. The parts are assembled on a massive terminal block 4 which is kept cool by water fed through pipes 5, 6, in the base of the machine. The upper terminal block is similarly kept cool. These blocks are shaped to closely embrace and fit around the radiator, which is shown at 8, leaving only the edges exposed to confine the heat strictly to a narrow line or zone. The upper terminal block may be movable as indicated, while the lower block rests on the bed plate of the welding machine. Both are in good electrical relation to the cables which supply the welding current and which lead to a transformer. The stamped parts are shaped so that when the blocks hold them together only the outer edges come into mutual contact. The upper block is movable vertically. It is raised and lowered by two cams 9, 9ª operated by gearing. The cams contain grooves which carry a roller 10, the grooves being concentric for a definite arc as from $a$ to $c$ with the shaft 11, and approaching the shaft center over the remaining arc. Thus the movable terminal block will be lowered into engagement with the radiator parts and will then have a "dwell" during which the electric current will heat the edges and weld the joints.

In Figs. 6 and 7 I have shown means for forming a hollow body of uniform diameter, such as a pipe. The half sections are formed in a shaping press or by passing between forming rolls, and then assembled between terminal blocks 12, 13, water-cooled by pipes with flexible leads 14, 15, 16. One of the blocks is pivoted, as at 17, and has a handle 18 to control its position and pressure. The pipe may be formed in short sections as in Fig. 8, or may be of an indefinite length, the weld being made at the two joints by a number of repeated operations. In the latter case the pipe may be shifted along almost the full length of the first weld before the circuit is closed for the second weld. The current density may be graduated to maintain the contacting edges at a welding heat notwithstanding the path across the joint section already welded.

It will thus be apparent that my invention may be applied to hollow articles of any conformation formed of duplicate parts properly shaped prior to the welding operation, and united along a plurality of joints.

What I claim as new and desire to secure by Letters Patent of the United States is,

1. The method of forming hollow articles of metal consisting in shaping a plurality of sections of thin planished sheet metal having edges adapted to abut, assembling the sections with their extended contact edges abutting one another, cooling the sections by engagement with a good heat conducting medium at all points in close proximity to the joints except at the joints, and applying a simultaneously localized heat and pressure to effect a weld whereby the parts are molecularly united without destroying the planished surface.

2. The method of forming hollow articles of metal consisting in shaping parts of thin planished sheet metal with their extended edges adapted to abut, assembling the parts so that they contact one with another along the edges, cooling the parts opposite the joints being made at all points adjacent to the joints, thereby preventing heating except at the joints, and passing an electric current transversely across the joints while the parts are in contact to effect a weld over the entire abutting surface whereby the parts are molecularly united without destroying the planished surface.

3. The method of forming tubes of sheet metal, consisting in welding together two curved sections of thin sheet metal having a planished surface at two separate joints, by an electric current led transversely across the two joints along an extended surface simultaneously, holding the parts under pressure while the current is applied, and cooling the parts immediately adjacent to the point of current application to prevent blemish of the metal.

4. The method of forming hollow articles of metal, consisting in shaping a plurality of thin sheet metal sections having a planished surface having extended edges adapted to abut, assembling two sections with all edges to be joined together abutting throughout their extent, cooling each of the sections at all points immediately opposite and adjacent their abutting edges, and simultaneously passing an electric current across the joint to weld the sections together whereby the parts are molecularly united without destroying the planished surface.

In witness whereof I have hereunto set my hand this seventeenth day of November, 1905.

OLIVER C. KNIPE

Witnesses:
A. M. THOMSON,
S. W. LOCKWOOD.